May 17, 1949.
T. E. TORKELSON
2,470,589
TORQUE CONVERTER
Filed March 27, 1947
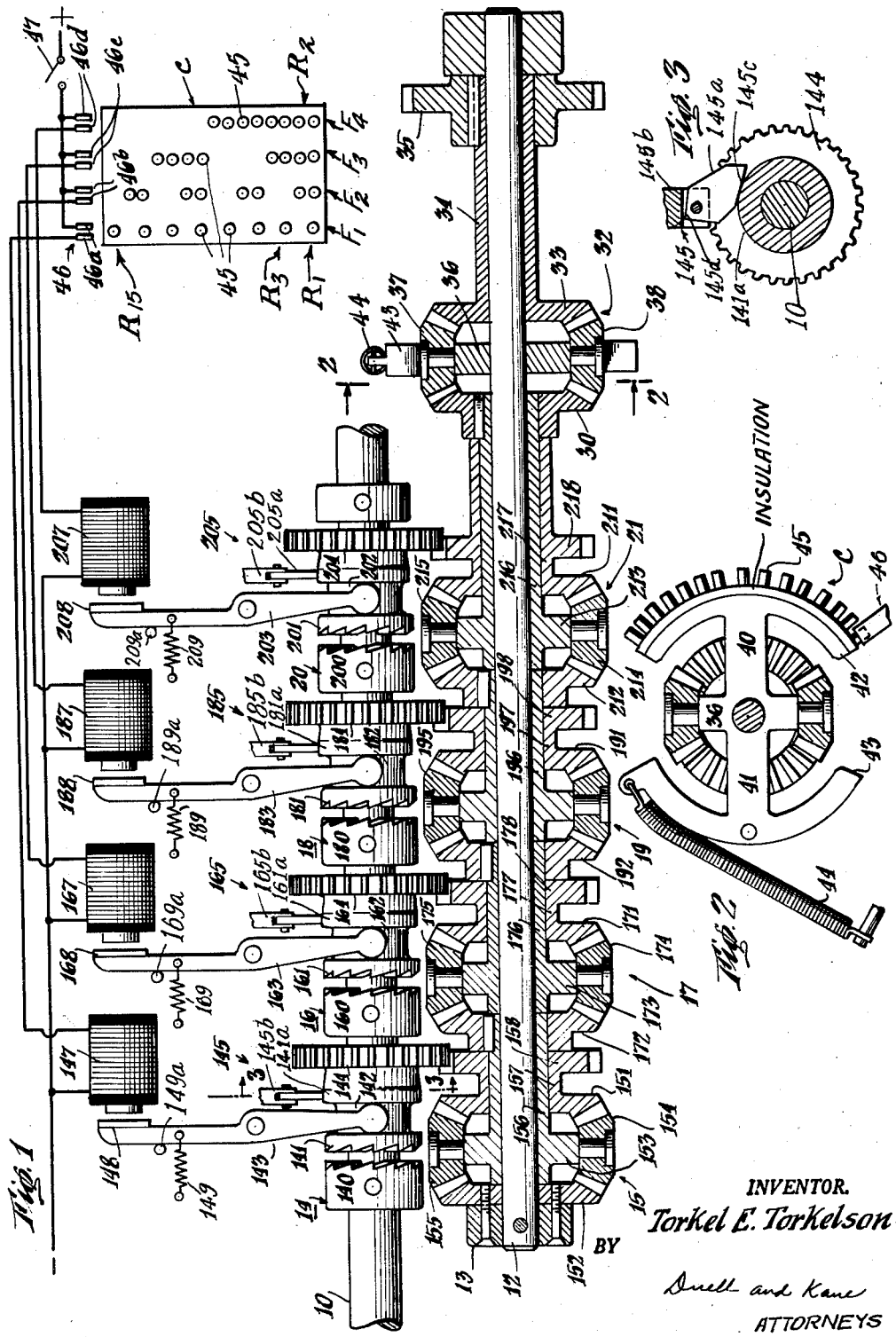
INVENTOR.
*Torkel E. Torkelson*
BY
*Duell and Kane*
ATTORNEYS Patented May 17, 1949

2,470,589

UNITED STATES PATENT OFFICE 2,470,589

TORQUE CONVERTER

Torkel E. Torkelson, Baldwin, N. Y., assignor to Associated Development & Research Corporation Application March 27, 1947, Serial No. 737,633

10 Claims. (Cl. 74—751)

1

This invention relates to transmission systems, and particularly to a multiple speed transmission in which a plurality of planetary gear systems are correlated with individually actuatable clutches in order to obtain a desired speed at a driven or transmission shaft with a constant speed on the drive shaft or engine crank shaft.

It is an object of the invention to provide an improved multiple speed transmission comprising a plurality of cooperatively organized, individually actuatable, planetary systems and means for automatically placing selected combinations of such systems in operation according to the desired output speed.

It is another object of the invention to provide a multiple speed transmission device incorporating a plurality of planetary gears arranged in tandem on a driven or transmission shaft, each planetary system having means whereby it may be individually connected to a driving shaft by remotely actuated clutch members.

It is yet another object of the invention to provide a multiple speed transmission in which the output speed is automatically controlled by the load.

It is a further object of the invention to provide an improved electro-mechanical variable speed transmission.

A presently preferred embodiment of the invention comprises a driving shaft, which may be an engine crank shaft, suitably rotatably supported in parallel spaced relationship with respect to a driven or transmission shaft. Said driving shaft has affixed thereon a plurality of independently actuatable clutches, and the driven shaft has an equal number of planetary gear systems. By means of suitable clutch operators, the rotation of the driving shaft may be transmitted to one or more of the planetary systems as desired.

The respective planetary systems are arranged in the familiar binary system, pursuant to which the speed of the driven shaft may change in arithmetical progression predicated upon the next higher power of two. Representing such next higher order by X, the speed ratio with respect to a constant-speed driving shaft ranges from $$\frac{1}{x} \text{ to } \frac{x-1}{x}$$

Automatic speed control is obtained through an additional planetary system in which a pair of gears are respectively responsive to the torque of the transmission output shaft and the torque

2 of the load shaft. A spider disposed between and engageable with said gears will therefore shift about its axis according to the torque differences of said gears. The shift of the spider may be utilized to effect various combinations of transmission planetary systems by an electric system including a spider-driven commutator and electromagnetic clutch actuators, as later explained.

Other features and advantages of the invention will be apparent from a reading of the following detailed description and the drawings, in which:

Fig. 1 is a schematic plan view, partly in section, of a transmission system embodying the invention;

Fig. 2 is a detail of the speed-control commutator unit, in elevation, and looking in the direction of the arrows 2—2 of Fig. 1;

Fig. 3 is a vertical section in the direction of the arrows 3—3 of Fig. 1, showing a presently preferred form of detent assembly.

Referring to the drawings, a power shaft 10 and an idler shaft 12 are suitably supported in fixed parallel relationship. Said power shaft is presumed to be rotated by suitable motive power (not shown). Disposed on said power shaft are clutch systems 14, 16, 18 and 20. The idler shaft supports a corresponding number of planetary gear systems 15, 17, 19 and 21.

The respective mechanical elements of each said system have been given reference numerals which include as the first two digits, the numbers accorded to the systems as a whole. For example, planetary system 15 includes the opposed sun gears 151 and 152, gear 152 in this instance being fixed against rotation in either direction, as by securement to the fixed bearing 13. Interposed between said gears 151 and 152 is a spider 153 on which are freely rotatably carried the planet gears 154, 155 which are in mesh with the said gears 151 and 152. The spider 153 is affixed to a sleeve 156 which is freely rotatable upon the shaft 12 and to the end of which is attached the bevel sun gear 172 of the next planetary system. Hence, a rotation of the sleeve 156 will correspondingly rotate the said gear 172. The gear 151 has a hub 157 which rotates freely upon the sleeve 156, and which has integral therewith or affixed thereto a spur gear 158.

The component elements of the respective clutches are similarly identified. Clutch 14 has a drive member 140 fixed to shaft 10 for rotation therewith; clutch 16 has a drive member 160, etc. Taking clutch 14 as exemplifying the clutch systems, a clutch member 141 is shiftable on shaft 10 for engagement with said clutch part 140. The collar or body portion of clutch element 141 has a track 142 within which rides the end of the pivoted clutch shift lever 143. Said clutch element 141 also has affixed thereto or formed integral therewith a spur gear 144 in continual mesh with the gear 158. The respective clutch means 141, 161, 181, 201, are held against rotation in one direction by means such as the detent assemblies 145, 165, 185, 205, in which a detent, as 145a, Fig. 3, is pivoted to fixed frame part 145b in alignment with the vertical center line of shaft 10. Face 145c of said detent tangentially engages the crowned portion 141a of clutch part 141, the point of engagement being angularly offset, in the direction of rotation, with respect to said vertical center line. Such angular offset prevents reverse rotation. When clutch part 141 is shifted to the left of Fig. 1, to engage clutch part 140, detent 145a rotates by gravity until its edge 145d abuts the undersurface of frame part 145b. Such limited rotation holds face 145c out of engagement with clutch part 141 by reason of the lessened diameter thereof to the right of the normal detent engaging surface.

The several clutch levers may be shifted by mechanical means, but preferably are actuated electromagnetically. For example, the electromagnet 147 has its core in operative relationship to an armature 148 provided on said lever. A spring 149 urges the lever 143 in counterclockwise rotation about its pivot, and hence the clutch member 141 is normally disengaged from clutch member 140. Stop pin or equivalent means 149a establishes the normal disengaged position by limiting the spring-induced rotation of the clutch levers.

Assuming now that clutch members 140 and 141 are in engagement but that the remaining clutch members are disengaged, the rotation of the driving shaft will be transmitted to the gear 158 and thence to gear 151, it being understood that detent 145 permits rotation of gear 144 in the direction of rotation of shaft 10, but not in counter-rotation. Gear 152 being fixed against rotation, the pinions 154 and 155 will travel over gear 152 in the same direction of rotation as gear 151, but spider 153 and its sleeve will revolve at one half the speed of gear 151. Assuming gears 144 and 158 to be of equal diameter, the spider 153 will therefore rotate at one half the speed of rotation of shaft 10.

Gear 172 being fixed to the end of sleeve 154 rotates therewith, and gear 171 is held against reverse rotation by the detent 165. Pinions 174 and 175 travel about fixed gear 171, and rotate spider 173 and sleeve 176 at one half the speed of gear 172, or one quarter the speed of driving shaft 10. Thus, so long as only clutch 14 system is driving, each planetary system operates at half the speed of its immediately preceding system, and in the embodiment illustrated the sleeve 216 will rotate at 1/16 of the speed of the driving shaft. Sleeve 216 is the driving shaft from which the apparatus to be driven derives its power. A gear 30 fixed to the end of shaft 216 may constitute a power take-off or an element in an automatic torque-responsive speed control, as later explained.

If all the clutches save clutch 20 were disengaged, the planetary systems in advance of number 21 would be inoperative, gear 212 would be restrained against rotation and sleeve 216 would rotate at half of the power shaft speed.

In the binary system, in accordance with which the illustrated gear system has been organized, the maximum output speed with all of the planetary systems in operation is one speed unit less than the next higher power of two. For example, the illustrated embodiment is of the 1—2—4—8 order. The next higher power of two is 16, and in accordance with the above, the maximum output speed attainable is 15 speed units. With various combinations of clutches in operation, speed ranges may be attained, in one unit increments, from one to fifteen. The following table illustrates the combinations of clutches which when in engaged position will produce various speeds in R. P. M. of gear 30, assuming the power shaft 10 to be operating at 16 R. P. M.:

| Clutches in engagement | | | | R. P. M. of gear 30 |
|---|---|---|---|---|
| 14 | 16 | 18 | 20 | 15 |
|    | 16 | 18 | 20 | 14 |
| 14 |    | 18 | 20 | 13 |
|    |    | 18 | 20 | 12 |
| 14 | 16 |    | 20 | 11 |
|    | 16 |    | 20 | 10 |
| 14 |    |    | 20 | 9 |
|    |    |    | 20 | 8 |
| 14 | 16 | 18 |    | 7 |
|    | 16 | 18 |    | 6 |
| 14 |    | 18 |    | 5 |
|    |    | 18 |    | 4 |
| 14 | 16 |    |    | 3 |
|    | 16 |    |    | 2 |
| 14 |    |    |    | 1 |

Such combinations of planetary systems may automatically be created according to the torque or resistance imposed upon the driven shaft. In the illustrated embodiment this may be accomplished by providing means for automatically energizing one or more of the clutch actuating electromagnets as the load on the driven shaft increases or decreases. Referring now to Fig. 2, the planetary system 32 includes the bevel gear 30 previously described and a cooperating bevel gear 33 freely rotatable upon the shaft 12 as by the sleeve 34 fixed to the said gear. Said sleeve is, in effect, the "driven" shaft, and may carry a gear, pulley or the like 35 for transmission of power to the apparatus to be driven. A spider 36 rotatable on shaft 12 carries two planet pinions 37, 38 which are in mesh with the respective gears 30 and 33.

From the spider 36 extends two preferably diametrically opposed arms 40 and 41 which respectively terminate in arcuate sectors 42 and 43. To the sector 43 there is attached a spring or equivalent 44 to restrain rotation of the spider upon the shaft 12 in one direction. Spring 44 is of such strength that the maximum load which the transmission system is designed to meet will extend it fully, at which point the respective sectors will have rotated through their full arcuate length. Under minimum torque conditions the spring will be in its relaxed, i. e., Fig. 2, position.

Sector 42 carries a commutator C having a plurality of mutually insulated, electrically conductive, pins or studs 45 arranged in four files, F1 to F4, to correspond to the four clutch systems. The ranks of the pins, i. e., the axially extending rows, R1 to R15, include one pin for each electromagnet to be energized. Since, as shown in the preceding table, there are fifteen combinations of engaged clutches, there are fifteen ranks in the commutator. A contactor 46 having pairs of mutually insulated fingers 46a, 46b, 46c, 46d, as schematically shown in Fig. 1, is provided adjacent the commutator. As the spider 36, and hence the commutator, rotates pursuant to the change in load on the output shaft, ranks of pins will come into engagement with the respective fingers, and circuits will be closed to energize the clutch magnets to change the speed of the driving shaft until equilibrium is restored between the driving and driven shafts. As shown in Fig. 1, the pins 45 are arranged in rows in registry with the respective contact pairs, and it is also apparent that said pins are so disposed as to close the electrical circuit to individual solenoids or groups thereof.

The wiring diagram of Fig. 1 shows clearly the electrical association of the commutator pins 45 and the respective clutch actuator magnets. Examination of the arrangement of the contact pins shows that, reading from top to bottom, the speed of the output shaft may be increased as the commutator rotates upwardly of Fig. 1.

The commutator C and the spring 44 are so arranged that with the load on the output shaft at a minimum, the spring holds the commutator so that all four contact pins in circuit with the respective clutch electromagnets are engaged by the respective contact fingers of the contactor 45, thus setting up a condition of operation wherein all of the four clutches will be in engaged position and the gear 30 will rotate at maximum speed.

Assuming the engine or driving motor to have been started, and the main switch 47 in the solenoid actuator circuit closed, the gear 30 will be rotating at maximum speed, as aforesaid. The driven apparatus—a motor vehicle for example—being initially at rest, the gear 33 will be stationary and the rotation of gear 30 will drive the spider 36 clockwise of Fig. 2, thus setting up additional combinations of clutch magnets and reducing the speed of gear 30 until the inertia of the vehicle is overcome; as the vehicle moves, the torque on gear 33 will decrease, and the spider and commutator 42 shifts under the urging of the spring 44 counterclockwise of Fig. 2, setting up combinations of clutches which will in step by step fashion increase the speed of gear 30 until there is a balance between the driving power and the load at which condition there will be no further gear shift until the load either decreases or increases.

As the load increases, as when the vehicle enters on an up grade, there will be a shift of the commutator in clockwise direction, whereupon the transmission will adjust itself to the increased load demand imposed upon it.

It will be understood that the basic control over engine speed is the conventional throttle (not shown). With full throttle, however, the transmission will always come to the maximum speed commensurate with the load being driven. It should also be understood that the torque-responsive control circuit may be replaced by, or supplemented by, a manually shiftable commutator system whenever such combination manual and automatic control, or solely manual control, is desirable.

Although the invention has been described by making a fully detailed reference to a certain presently preferred embodiment, such detail of description is to be understood in an instructive rather than a limiting sense, many changes being possible within the scope of the claims hereto appended.

I claim:

1. In an automatic speed-change transmission, a power shaft, a driving shaft, and a driven shaft; a planetary system interposed between said driving shaft and said driven shaft and providing power transmission means therebetween, said planetary system including a spider rotatable relative to said driving and driven shafts according to the torque differential thereof, said spider having means resiliently urging it in one direction of rotation; a series of planetary gear systems arranged on an idler shaft, each said planetary system including spaced sun gears and spider-mounted planet gears meshing therewith, said planet gears being mechanically interconnected with a sun gear of the succeeding system, the said driving shaft comprising an element of the last of said series of planetary systems; a normally disengaged clutch system individual to each said planetary system mounted on said power shaft, and each having a clutch element in driving relationship with its associated planetary system; an electromagnet individual to each clutch system for actuating the same into engaged position; and an electric system responsive to torque differential between said driving and driven shafts to energize said clutch electromagnet singly or in combination to establish a desired speed of the driving shaft, said system including a commutator carried by said spider for rotation therewith; a fixed contactor including contacting finger means individual to each said electromagnet, and a plurality of mutually insulated, conductive studs arranged in rank and file on said commutator for circuit closing engagement with said fingers upon rotation of said commutator, there being a file of said studs for each electromagnet, and the number and disposition of studs in the respective ranks determining the number of clutch actuating circuits which will be closed when a rank comes into operation relationship with the fingers of the contactor.

2. In an automatic speed-change transmission, a power shaft, a driving shaft, and a driven shaft; a planetary system interposed between said driving shaft and said driven shaft and providing power transmission means therebetween, said planetary system including a spider rotatable relative to said driving and driven shafts according to the torque differential thereof, said spider having means resiliently urging it in one direction of rotation; a series of planetary gear systems arranged on an idler shaft, each said planetary system including spaced sun gears and spider-mounted planet gears meshing therewith, said planet gear spider including a hub mounted on said idler shaft mechanically interconnected with a sun gear of the succeeding system, the said driving shaft comprising an element of the last of said series of planetary systems; a normally disengaged clutch system individual to each said planetary system mounted on said power shaft, and each having a clutch element in driving relationship with its associated planetary system; a clutch-shift lever for each clutch system to move the respective clutches into engaged position, an electromagnet individual to each lever for operating the same, and means for energizing said magnets in preselected combinations to interconnect said power shaft with the respective planetary system, comprising a commutator rotated by said spider, a contactor fixed relative to said commutator and having a contact member forming an element of the energizing circuit of each magnet, and a plurality of contact means on said commutator for closing said energizing circuits in predetermined combinations as said commutator rotates in one or another direction according to the torque differential between the driving and driven shafts.

3. In an automatic speed-change transmission, a power shaft, a driving shaft, and a driven shaft; a planetary system interposed between said driving shaft and said driven shaft and providing power transmission means therebetween, said planetary system including a spider rotatable relative to said driving and driven shafts according to the torque differential thereof, said spider having means resiliently urging it in one direction of rotation; a series of planetary gear systems arranged on an idler shaft, each said planetary system including spaced sun gears and spider-mounted planet gears meshing therewith, said planet gears being directly mechanically interconnected with a sun gear of the succeeding system, the said driving shaft comprising an element of the last of said series of planetary systems; a normally disengaged clutch system individual to each said planetary system mounted on said power shaft, and each having a clutch element in driving relationship with its associated planetary system; electrically energized means for operating each said clutch, and means controlled by the rotation of said spider upon a change in the torque on said driven shaft to energize said clutch operating means, including a contactor having contact fingers in open circuit relationship with said clutch operating means, a commutator rotatable by said spider, and contact members on said commutator and engageable with said contact fingers to close combinations of clutch operating circuits according to the extent of rotation of said commutator.

4. In an automatic speed-change transmission, a power shaft, a driving shaft, and a driven shaft; a planetary system interposed between said driving shaft and said driven shaft and providing power transmission means therebetween, said planetary system including a spider rotatable relative to said driving and driven shafts according to the torque differential thereof, said spider having means resiliently urging it in one direction of rotation; a series of planetary gear systems arranged on an idler shaft, each system including a rotatable spider mounting for the planet gears, each said mounting being directly connected to a sun gear of the succeeding system, and the spider of the last system of the series being connected to the driving shaft for rotation thereof; a series of clutch systems on said power shaft to transmit power to preselected groups of planetary systems; and an electromagnet individual to each said clutch system for actuating the same in combinations according to the direction and extent of rotation of said first-named spider, said system including a commutator rotatable by said spider and a plurality of electric circuits operated by said commutator to energize said electromagnets.

5. In an automatic speed-change transmission, a power shaft, a driving shaft, and a driven shaft; means flexibly interconnecting said driving and driven shafts, and including an element rotatable relative to said shafts according to the torque difference therebetween; a series of planetary gear systems arranged on an idler shaft, said systems including paired sun gears and therewith meshing planet gears carried upon a rotatable spider, the spider of one system being connected to a sun gear of a succeeding system and the other sun gear of each system being arranged to be rotated by said power shaft; a clutch individual to each planetary system for connecting the last-named sun gear thereof to the power shaft for rotation thereby; detent means associated with each clutch for preventing rotation of the clutch controlled sun gears by their associated planet gears; means for rotating said driving shaft from the spider of the last planetary system of the series; and means operated by the rotation of the said element of the driving and driven shaft interconnection means for operating said clutches individually or in combination according to the torque differential between said driving and driven shafts.

6. An automatic speed-change transmission, including a power shaft, a driving shaft, and a driven shaft; and torque-differential responsive means including a gear mechanically connected to said driving shaft, a gear mechanically connected to said driven shaft, freely rotatable planetary gears intermeshing with said gears, and a resiliently restrained, rotatably mounted spider for supporting said planetary gears; means for establishing an equilibrium position for said spider for any constant torque differential; a series of planetary gear units arranged on an idler shaft, and each unit including spaced sun gears and planetary gears meshing therewith, said planetary gears being mechanically interconnected with the sun gear of the succeeding unit, and the last of said units being mechanically interconnected to said driving shaft to transmit power from said power shaft thereto; a series of normally disengaged clutches individual to each planetary unit and including a driving element therefor; an electromagnet individual to each said clutch for effecting clutch engagement; and an electrical circuit for energizing said electromagnets individually or in predetermined combinations according to the equilibrium position of said spider, said circuit including a pair of spaced terminals individual to each electromagnet and in series electrical connection therewith, and an arcuate commutator carried by said spider and having a plurality of mutually electrically insulated terminal-bridging pins disposed in files in alignment with said pairs of terminals and arranged in cross-rows according to the number of pairs of terminals to be bridged at one time, whereby rotation of said spider and therewith associated commutator will progressively close various combinations of electromagnet circuits until the equilibrium point of said spider is reached.

7. An automatic speed change transmission, including a power shaft, a driving shaft, a driven shaft, and speed-differential responsive means between said driving shaft and said driven shaft, said means including a rotatably mounted element having gear means engaging with and driven by the driven shaft and the driving shaft; means for establishing an equilibrium position for said rotatable element for any given speed differential; a series of planetary gear assemblies arranged on an idler shaft, each assembly including spaced sun gears and planet gears meshing therewith, said planet gears being mechanically interconnected with a sun gear of the succeeding assembly and the last of said assemblies being mechanically interconnected to said driving shaft to transmit power from said power shaft thereto; a series of normally disengaged clutches individual to each planetary assembly and including a driving element therefor; electric clutch actuating means individual to each of said clutches; and an electric circuit for operating said means singly or in combination, comprising a pair of spaced terminals individual to each clutch and in series electrical connection therewith, a plurality of mutually electrically insulated terminal-bridging contacts disposed in ranks in alignment with said pairs of terminals and arranged in cross-files according to the number of said pairs of terminals to be bridged at one time; and means for moving said contacts into bridging position according to the speed differential between said driving shaft and said driven shaft.

8. An automatic speed change transmission, including a power shaft, a driving shaft, and a driven shaft, torque responsive means between said driving shaft and said driven shaft, said means including an element rotatable in one or another direction according to the torque difference between the driven shaft and the driving shaft; means for establishing an equilibrium position for said rotatable element for any given torque difference; a series of planetary gear systems arranged on an idler shaft, said systems including spaced sun gears, planet gears intermeshing therewith, and a rotatable spider for carrying said planet gears, the spider of each system being mechanically interconnected with a sun gear of the succeeding system and the last of said systems being mechanically interconnected to said driving shaft to transmit power from said power shaft thereto; a series of normally disengaged clutches individual to each planetary system and including means for connecting the second sun gear of each system to said power shaft; electric clutch actuating means individual to each of said clutches; a normally open electrical circuit for each of said clutch actuating means, and circuit closing means controlled by rotation of said torque-responsive element for closing the circuit to one or a combination of clutch actuators according to the extent of rotation of said element.

9. An automatic speed-change transmission, including a power shaft, a driving shaft, a driven shaft, and torque-responsive means between said driving shaft and said driven shaft, said torque-responsive means including a planetary system having sun gears connected respectively to said driving shaft and said driven shaft and a resiliently restrained planet gear element rotatable in one or another direction according to the torque difference between the driving shaft and the driven shaft; a series of planetary gear systems arranged on an idler shaft in mechanically interconnected relationship, the last of said planetary systems being mechanically connected to said driving shaft to transmit power from said power shaft thereto; a series of normally disengaged clutches on said power shaft, each said clutch being associated with a different one of said planetary systems and including a driving element therefor; clutch actuating means individual to each of said clutches; and an electrical system actuated by rotation of said torque responsive means to operate said clutches individually or in combination according to the extent of rotation of said torque responsive means.

10. A transmission system comprising a plurality of planetary gear assemblies, each assembly having spaced sun gears and planet gears engaging therewith, said planet gears being carried by a rotatable spider having a driving connection with a sun gear of the succeeding planetary system, and the other sun gear of each said system being arranged for independent connection to a common power source; clutch means individual to each said planetary system for connecting or disconnecting the said other sun gear thereof with said common power source; means associated with each said clutch controlled sun gear for preventing rotation thereof by its associated planet gear except when in connection with said power source; a driven shaft; torque responsive means drivingly connecting the last of said planetary systems and said driven shaft, said responsive means including an element rotatable upon relative difference in torque between said driven shaft and said last planetary gear system; and means responsive to the rotation of said element for actuating said clutch systems according to a preestablished combinational relationship.

TORKEL E. TORKELSON.

REFERENCES CITED

The following references are of record in the file of this patent:

UNITED STATES PATENTS

| Number | Name | Date |
| --- | --- | --- |
| 559,870 | Scoffield | Mar. 1, 1898 |
| 2,241,334 | Stucatur | May 6, 1941 |

FOREIGN PATENTS

| Number | Country | Date |
| --- | --- | --- |
| 297,828 | Germany | July 2, 1928 |